United States Patent
Wang et al.

(10) Patent No.: US 8,206,666 B2
(45) Date of Patent: Jun. 26, 2012

(54) REACTORS HAVING VARYING CROSS-SECTION, METHODS OF MAKING SAME, AND METHODS OF CONDUCTING REACTIONS WITH VARYING LOCAL CONTACT TIME

(75) Inventors: Yong Wang, Richland, WA (US); Chunshe Cao, Kennewick, WA (US); James B. Kimble, Bartlesville, OK (US); Laura J. Silva, Dublin, OH (US)

(73) Assignee: Battelle Memorial Institute, Richland, WA (US)

( * ) Notice: Subject to any disclaimer, the term of this patent is extended or adjusted under 35 U.S.C. 154(b) by 1133 days.

(21) Appl. No.: 10/153,577

(22) Filed: May 21, 2002

(65) Prior Publication Data

US 2003/0219903 A1 Nov. 27, 2003

(51) Int. Cl.
*B01J 8/00* (2006.01)
*B01J 8/02* (2006.01)
*B01J 19/24* (2006.01)

(52) U.S. Cl. ........ 422/601; 422/602; 422/603; 422/198; 422/211

(58) Field of Classification Search .................. 422/601, 422/602, 603, 198, 211
See application file for complete search history.

(56) References Cited

U.S. PATENT DOCUMENTS

| | | | | |
|---|---|---|---|---|
| 1,825,321 A * | 9/1931 | La Mont et al. | ............... | 165/147 |
| 3,503,712 A * | 3/1970 | Sussman | ........................ | 422/191 |
| 4,438,809 A | 3/1984 | Papis | ............................ | 163/166 |
| 4,795,618 A | 1/1989 | Laumen | ......................... | 422/202 |
| 4,953,634 A * | 9/1990 | Nelson et al. | .................. | 165/147 |
| 5,405,586 A * | 4/1995 | Koves | ............................. | 422/218 |
| 5,600,052 A * | 2/1997 | Girod et al. | ..................... | 585/654 |
| 5,997,826 A | 12/1999 | Lodeng et al. | ................. | 422/190 |
| 6,150,180 A * | 11/2000 | Parce et al. | ........................ | 506/7 |
| 6,165,633 A | 12/2000 | Negishi | ............................ | 429/17 |
| 6,375,871 B1 * | 4/2002 | Bentsen et al. | .................. | 264/1.6 |
| 6,517,234 B1 | 2/2003 | Kopf-Sill et al. | ............... | 366/340 |
| 6,613,446 B1 | 9/2003 | Peters et al. | .................... | 428/593 |
| 6,806,087 B2 * | 10/2004 | Kibby et al. | ..................... | 436/37 |
| 7,000,684 B2 | 2/2006 | Kenny et al. | | |
| 7,201,873 B2 * | 4/2007 | Tanaka et al. | ................... | 422/401 |
| 2002/0106311 A1 | 8/2002 | Golbig et al. | | |
| 2002/0194990 A1 | 12/2002 | Wegeng et al. | | |
| 2003/0068261 A1 | 4/2003 | Taheri | ............................ | 422/197 |
| 2003/0180216 A1 | 9/2003 | TeGrotenhuis et al. | ........ | 423/659 |
| 2006/0151147 A1 | 7/2006 | Symonds | | |

FOREIGN PATENT DOCUMENTS

| | | |
|---|---|---|
| EP | 0869842 A2 | 10/2001 |
| EP | 1382382 A1 | 1/2003 |
| EP | 1306639 A2 | 5/2003 |
| JP | 61054229 A * | 3/1986 |
| WO | WO 03/011449 A1 | 2/2003 |
| WO | WO 03/031050 A1 | 4/2003 |
| WO | WO 03/033985 A1 | 4/2003 |

* cited by examiner

*Primary Examiner* — Jennifer A Leung
(74) *Attorney, Agent, or Firm* — Frank Rosenberg; Derek Maughan

(57) ABSTRACT

The present invention provides methods of conducting chemical reactions in a reaction channel that has an varying cross-sectional area such that a chemical reactant or reactants experience varying local contact time as the reactant(s) flow through the channel. The invention also provides reactors having reaction channels with varying cross-sectional areas. In a particularly preferred embodiment, the reaction channel section has a trapezoidal shape that becomes broader from the inlet toward the outlet.

23 Claims, 4 Drawing Sheets

US 8,206,666 B2

REACTORS HAVING VARYING CROSS-SECTION, METHODS OF MAKING SAME, AND METHODS OF CONDUCTING REACTIONS WITH VARYING LOCAL CONTACT TIME

FIELD OF THE INVENTION

The invention relates to chemical reactors comprising a reaction microchannel and to methods for reacting materials in the reactors. The invention also relates to reactors having multiple channels emanating from a common inlet and to methods for reacting materials in these reactors.

BACKGROUND OF THE INVENTION

In conventional chemical reactors, the reaction chamber containing the catalyst has straight walls in the direction of the flow. Thus, the reaction chamber forms a channel that has a constant cross-section along the flow direction over the length of the chamber between an inlet and an outlet. The conventional reactors described here include flow through type catalytic and non-catalytic reactors. Catalytic reactions are either heterogeneous or homogeneous.

Straight channel reactors have several drawbacks. For non-zero order homogeneous or heterogeneous reactions, temperature varies considerably from point to point in the catalyst bed, in particular for highly exothermic or endothermic chemical reactions. Temperature lacks uniformity in the axial direction (flow direction) and reactant concentrations are typically high in the inlet zone. As a result, the integrated effects can cause high reaction rates in the inlet zone for highly exothermic reactions, as well as local hot spots, resulting in fast catalyst deactivation and low selectivity of desired products. On the other hand, for endothermic reactions, this can cause cold spots and poorer catalyst utilization.

SUMMARY OF THE INVENTION

The present invention provides a method for conducting a chemical reaction in the presence of a catalyst, comprising introducing a reactant (or reactants) into an inlet of a reaction microchannel containing the catalyst and increasing or decreasing linear velocity of the composition (or increasing or decreasing a local contact time between the composition and the catalyst) substantially along a flow path in a microchannel containing the reaction catalyst. In the cases of non-catalytic reactions, the presence of catalysts is not required. The catalyzed reactions can be homogeneous or heterogeneous, and reactors include flow through type with fixed bed or fluidized bed catalysts.

The present invention also provides a method for chemically reacting a composition in the presence of a catalyst, comprising introducing the composition into an inlet of a reaction microchannel containing the catalyst, wherein an area of a cross-section of the reaction microchannel increases substantially or decreases substantially along a flow path of a microchannel containing the catalyst.

The present invention further provides a method for chemically reacting a composition in the presence of a catalyst, comprising introducing the composition into an inlet of a reaction microchannel containing the catalyst, wherein an area of a cross-section of an inlet side of a reaction microchannel is smaller than an area of a cross-section of an outlet side of the reaction microchannel, the catalyst being provided from the inlet side to the outlet side of the microchannel.

The present invention also provides a method for chemically reacting a composition in the presence of a catalyst, comprising introducing the composition into respective inlets of a plurality of channels, the inlets being situated in a common inlet zone and the channels radiating from the common inlet zone, wherein, in each of the channels, an area of a cross-section of the reaction channel increases substantially from an inlet side to an outlet side of a channel section containing reaction the catalyst.

The present invention also provides a catalytic chemical reactor comprising a reaction microchannel having an inlet connected to a source of reactive material and an outlet, the reaction microchannel containing a reaction catalyst, wherein a cross-section of the reaction channel increases along a flow path in a channel section containing the reaction catalyst. Preferably, the reactor includes a heat exchanger adjacent the reaction microchannel.

The present invention further provides a catalytic chemical reactor comprising a plurality of reaction channels having respective inlets connected to at least one source of reactive material and situated in a common inlet zone, the channels radiating from the common inlet zone, wherein, in each of the channels, an area of a cross-section of the reaction channel increases substantially along a flow path in a channel section containing the reaction catalyst. In some preferred embodiments, the reactor includes a common footer disposed about the common inlet in a spoke-and-wheel design. The reactor can be run in reverse with reactants entering through the "outlets" and exiting through the common "inlet"—in this reverse orientation, an area of a cross-section of the reaction channel decreases substantially along a flow path in a channel section containing the reaction catalyst.

The invention further provides a chemical reactor comprising: a reaction microchannel comprising an inlet side and an outlet side; wherein an area of a cross-section of the inlet side of the reaction channel is different than an area of a cross-section of the outlet side of the reaction channel; and wherein the height of the reaction microchannel is constant over the entire length of the microchannel. The invention also includes methods of conducting a chemical reaction comprising passing at least one reactant into the reaction microchannel where it reacts (by itself or with other molecules) to form at least one product. As with all other aspects of the invention that are described in this Summary section, the invention can be modified according to any of the various descriptions provided, including the descriptions of the preferred embodiments.

The present invention further provides a method for chemically reacting a material in the above embodiments except that, in the cases of non-catalytic systems, the presence of catalyst is not required.

Various embodiments of the invention can provide numerous advantages including one or more of the following. The coupling of chemical reaction and heat transfer can be improved, which may result in more uniform temperature distribution in the catalyst bed. Linear velocity or local contact time can be gradually increased or decreased from the inlet to the outlet of the reaction section. Temperature distribution and local conversion profiles are flattened, which can be critical in improving product selectivity and prolonging catalyst life. Reactor productivity can be improved because the uniform temperature profile permits the reactor to be operated with a larger part of the reactor volume near its optimal temperature.

Without wishing to be bound by a particular explanation or theory, it is believed that the improvement in the properties of the inventive reactors and methods, as compared with prior art, may be related to the following aspects. In the channel reactor according to the present invention, the heat generation rate is lowered in the prospective hot spot area, while heat is conducted away in an efficient manner. Conversely, the heat generation rate is increased in the cold spot areas so as to maintain temperature. A narrow inlet area decreases the reaction extent by increasing the linear velocity or reducing contact time, and, thus, for exothermic reactions, the narrow inlet area reduces the heat generated in that area. The narrow inlet area can also increase the heat-removing rate because of the short distance for heat transfer. On the other hand, the extent of reaction (extent of conversion) is increased in the wider section of the bed because of the lower linear velocity or longer contact time, while the heat conduction rate may be reduced due to the increase of bed thickness. As a result, the reaction heat may be forced to spread out over the whole reactor bed, which is believed to improve the uniformity of temperature distribution.

The impact of the present invention is qualitatively different in microchannel reactors. Microchannel reactors have improved heat and mass transfer efficiency. Therefore, reactions typically occur in a kinetically-controlled regime. In microchannels, improving the uniformity of temperature distribution in the flow direction improves greatly the uniformity of temperature distribution in the whole bed. It has been surprisingly discovered that superior modeling results, such as better temperature control, occur in reactors and methods utilizing the microchannel design described herein. It is believed that comparable advantages are not available in apparatus with conventional flowpaths.

The subject matter of the present invention is particularly pointed out and distinctly claimed in the concluding portion of this specification. However, both the organization and method of operation, together with further advantages and objects thereof, may be better understood by reference to the following description taken in connection with accompanying drawings wherein like reference characters refer to like elements.

GLOSSARY OF TERMS

"Channels" refers to the generally accepted meaning and includes conduits and other means for directing the flow of a fluid. Channels of the invention include at least one opening, typically with an inlet and outlet, and may include other openings. As will be seen in the description below of various embodiments, numerous functions other than simple transport can occur within channels. A reaction channel (including a reaction microchannel) does not include inlet or outlet valves or inlet or outlet orifices (of course inlet and outlet orifices, valves, etc. may be connected to a reaction channel but they are not considered part of the reaction channel itself).

"Catalyst" is a material that enhances reaction parameters, for example reaction rate, without itself being consumed. A catalyst can be heterogeneous (typically a solid) or homogeneous (for example, dissolved in the reactant stream).

A "Cross-sectional area," or "an area of a cross-section," is measured perpendicular to the direction of net flow and includes all area within a reaction channel including catalyst particles (or monolith) and catalyst coating but does not include the reaction channel walls. For reaction channels that curve along their length, cross-sectional area is measured perpendicular to the direction of net flow at a selected point along a line that parallels length and is at the center (by area) of the reaction channel. Statements such as "a cross sectional area varies" mean that there is a significant variation in area, not merely a variation in surface roughness. Dimensions of height and width are measured from one reaction channel wall to the opposite wall and are not changed by application of a catalyst coating, and are average values that account for variations caused by surface roughness, or variations caused by corrugations, etc.

"Engineered catalyst" is a single piece or several pieces of catalysts that can be shaped for a particular reaction channel and inserted or stacked into a microchannel. Preferred examples are foams and felts (that is, a collection of nonwoven fibers or strands). Pellets, coatings and powders are not engineered catalysts.

"Composition" is a gas, a liquid, or a fluid mixture (such as a colloid which could be a solid/liquid mixture). The composition may itself be reactive or may be mixed with another material.

"Direction of flow" is the direction of net flow through at least one segment of a reaction channel. For a straight channel, the direction of flow is from the inlet or inlets of a channel to the outlet or outlets of the channel.

"Flow path" is a path in the reactor through which travels a composition.

"Fluid Heat exchanger" is a chamber (having an inlet and an outlet, or multiple inlets and/or outlets) through which a fluid (i.e., a gas or liquid) flows and, through a wall of the reaction channel, conducts heat away from or toward a reaction channel. A fluid heat exchanger is not an electrical heater.

"Gradually" means progressive over a zone along a given orientation. The progression can be continuous or by steps in the zone, and can include localized regression within the zone.

"Heat exchanger" is a component that adds or removes heat from a reaction chamber. It is an active component, not merely ambient air or a stagnant fluid. Preferably, the heat exchanger is a fluid heat exchanger.

"Heat transfer distance" is the distance between the midpoint of a reaction channel and the wall of a heat exchanger. The midpoint is the area-weighted center point of a cross-section of the reaction channel, and distance is typically measured perpendicular to flow. In other words, the midpoint is the intersection of lines that bisect (divide in half) the cross-sectional area of the reaction channel.

"Inlet side" and "outlet side" are relative terms. Every part of the inlet side of a reaction chamber is closer to an inlet into a reaction channel, and every part of the outlet side of a reaction chamber is closer to an outlet from a reaction channel. In preferred embodiments, there are a single inlet and a single outlet connected to a reaction channel, however, the invention includes reaction channels with multiple inlets and/or outlets.

"Local contact time" is the contact time experienced by a reactant composition in a portion (the local portion) of a reaction chamber. For purposes of the present invention, local contact time is based on the quantity of composition entering a reaction chamber—it excludes the effects of changing in the amount (number of moles) of composition as it reacts in the reaction chamber.

"Linear velocity" is defined as the reactant volumetric flow-rate divided by the cross section area of the reactor channel, and also excludes the effect of reduced reactant as it reacts in the reaction chamber. The contact time is calculated by dividing the volume under consideration by the fluid flow at normal temperature and pressure, that is 0° C. and 1 atm pressure.

A "microchannel," for purposes of the present invention, is a channel having a height of 5 mm or less, preferably 2 mm or less, and still more preferably 1 mm or less, and in some preferred embodiments height is in the range of 0.1 and 2 mm. Length of a microchannel is typically not crucial but, in some embodiments is less than 10 cm. Length is defined to be the same direction as net flow through a microchannel. Channels can be, for example, rectangular, circular, triangular, or irregularly shaped. Height and width are perpendicular to length and either or both can vary along the length of a microchannel. Height and width can be arbitrarily selected; in the present invention, height is defined as the smallest dimension of a channel that is perpendicular to flow. In some embodiments, such as steam reforming, width is preferably 5 cm or less, more preferably 1 cm or less, and in some embodiments in the range of 0.1 mm and 2 cm.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF PREFERRED EMBODIMENTS

Figure 2:
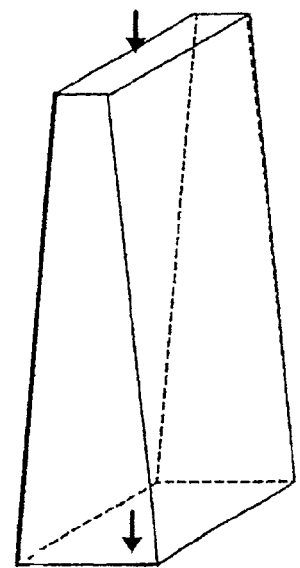
FIG. 2 is a schematic perspective view of a channel of a chemical reactor according to a first embodiment of the present invention.

A trapezoid channel reactor is illustrated in FIG. 2. In each reactor, the inlet and the outlet are symbolized by arrows indicating the direction of flow. Optionally, the reactor chamber temperature is controlled through heat transfer to or from a heat exchange fluid stream in an adjacent heat exchanger or heat exchangers (not shown). In the design according to FIG. 2, the catalyst channel has a cross-section that increases gradually from the inlet toward the outlet. Specifically, the catalyst channel has a trapezoidal shape in a plane that includes a flow line of the channel.

Figure 1:
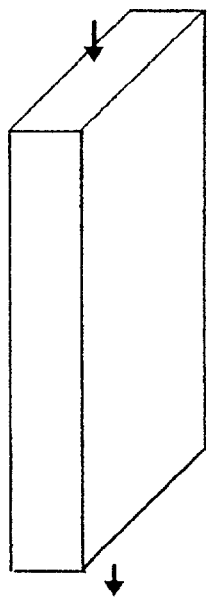
FIG. 1 is a schematic perspective view of a prior art, conventional straight channel reactor.

In a conventional straight channel reactor (such as shown in FIG. 1), exothermic reactions may cause a hot spot whose magnitude and location depend on reaction kinetics, heat/mass transfer and hydrodynamics. For heterogeneously-catalyzed, fixed-bed reactors, the hot spot is located in the front part of the catalyst bed, near the inlet area for non-zero order reactions.

In contrast, a narrower inlet area of the channel reactor according to the present invention decreases the reaction extent near the inlet area due to a shorter contact time. Therefore, near the inlet area, the reaction heat release of an exothermic reaction (or heat absorption of an endothermic reaction) is reduced. The local conversion profile along the catalyst bed becomes more uniform than in a straight channel reactor, as the local contact time increases gradually from the reactor inlet to the outlet section.

The dimensions of the cross-sectional area and its variations are selected as a function of the particular application and performance desired, for example, so as to obtain an optimized temperature profile. Fluids may be preheated, for example to the reactor inlet temperature.

Figure 3:
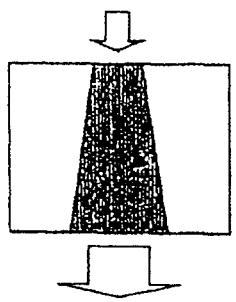
FIG. 3 is a schematic longitudinal cross-sectional view of a linear channel chemical reactor according to a second embodiment of the present invention.

FIG. 3 shows schematically a single channel reactor having an inlet, an outlet, and whose cross-section increases gradually from the inlet side to the outlet side. Preferably, the walls of the channel define the boundaries of heat transfer channels, so as to provide heat regulation to the reaction chamber and, optionally, pre-heat reactive material prior to its delivery at the inlet of the reaction channel. Thus, the temperature regulation provided by the heat transfer channels cooperates with the temperature regulation provided by the increasing cross-section to improve the temperature profile in the reactor channel.

Figure 4:
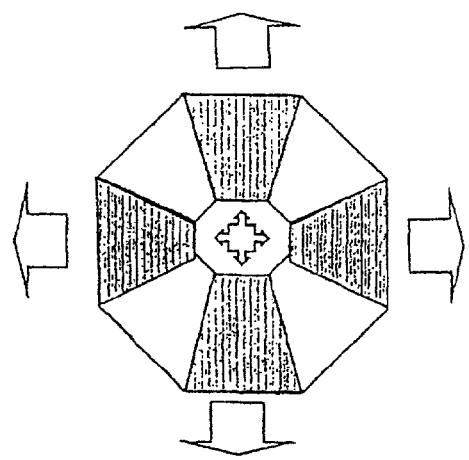
FIG. 4 is a schematic longitudinal cross-sectional view of a multi-channel chemical reactor according to a third embodiment of the present invention.
Figure 5:
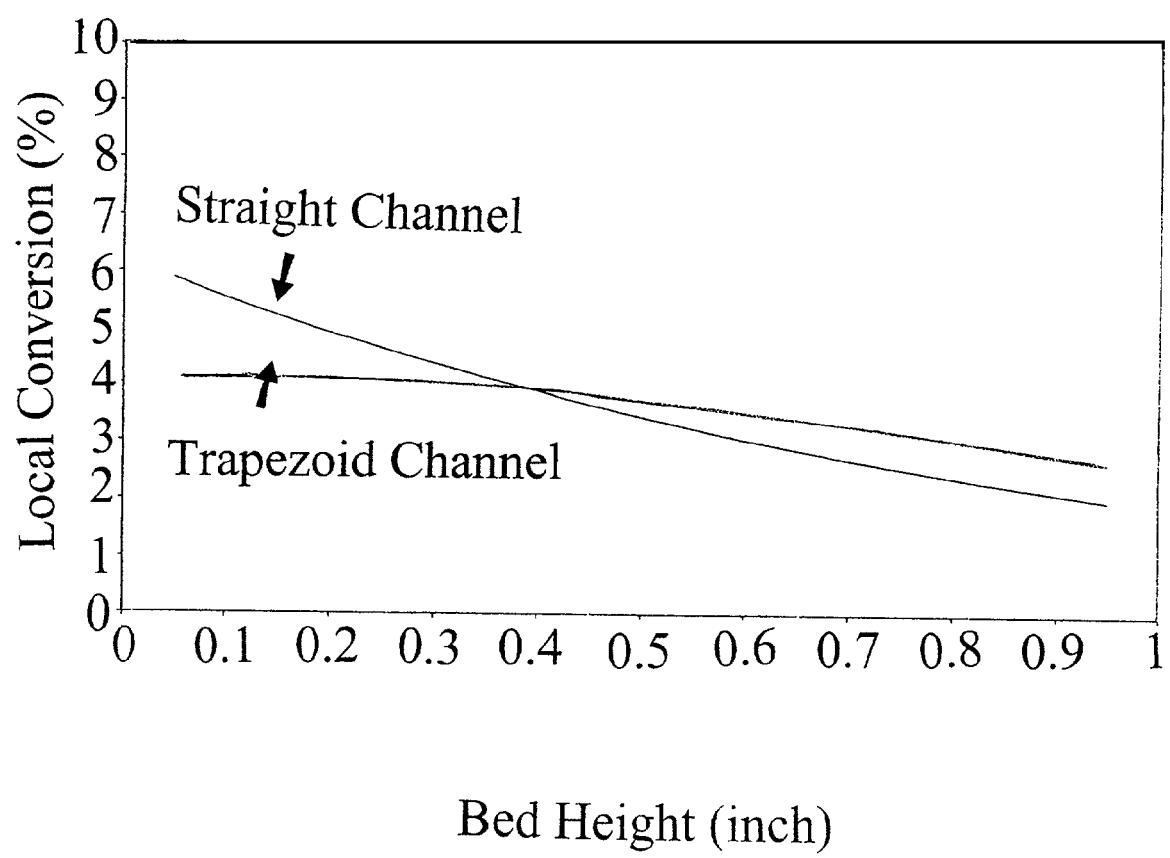
FIG. 5 is a graph comparing the local conversion profile in a trapezoidal reactor and in a straight channel reactor in an exemplary embodiment of the present invention.
Figure 6:
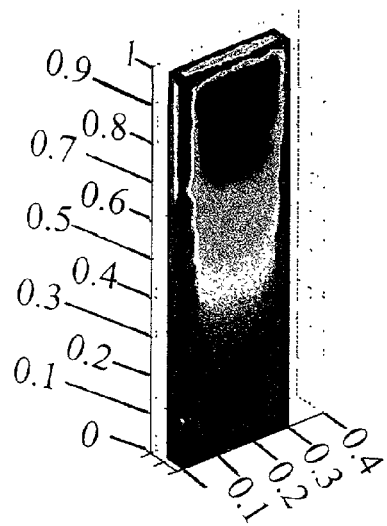
FIG. 6 shows the results of a model calculation of surface heat flux and sliced temperature profile in the catalyst bed of a straight channel reactor.
Figure 6:
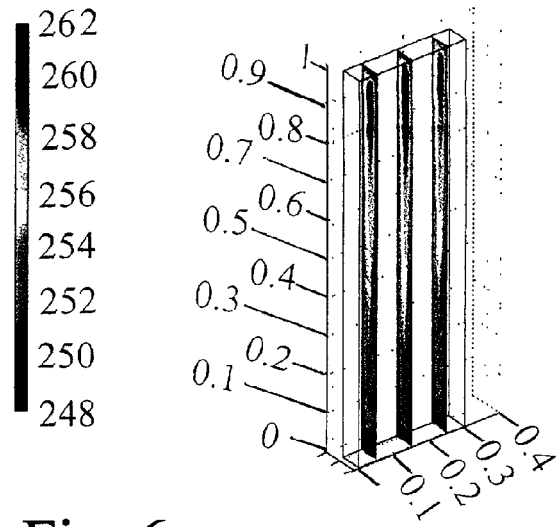
Figure 7:
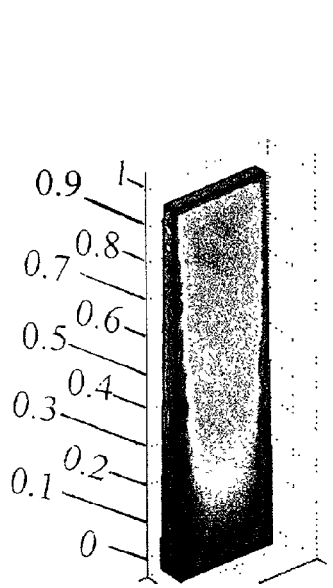
FIG. 7 shows the results of a model calculation of surface heat flux and sliced temperature profile in the catalyst bed of a trapezoidal channel reactor.
Figure 7:
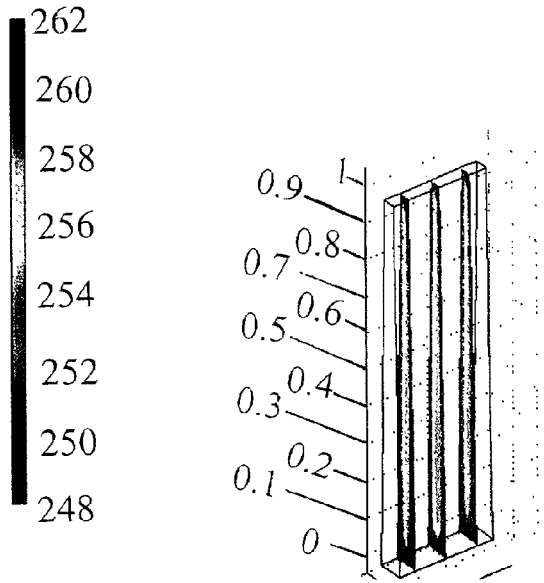

FIG. 4 shows schematically a multi-channel reactor, in which a plurality of reaction channels, four channels in the illustrated embodiment, are disposed radially in a same layer, with their inlets located in a common central inlet zone. The illustrated reaction channels have a trapezoidal shape with a cross-section that increases from the inlet toward the outlet. The inlets of the reaction channels are in fluid communication with a common central inlet channel having an octagonal shape transverse to the plane of the reaction channels. The outlets can be in fluid communication with an annular common outlet channel (not shown). Thus, supply and evacuation of fluids to and from the reaction channels of the same layer can be performed through a common inlet and/or a common outlet channel. In addition, several layers of reaction channels can be stacked one above the others (either overlapping—as viewed from above, or in a staggered configuration), while still using common inlet and outlet channels (that is, they may share common headers or footers).

Figure 8:
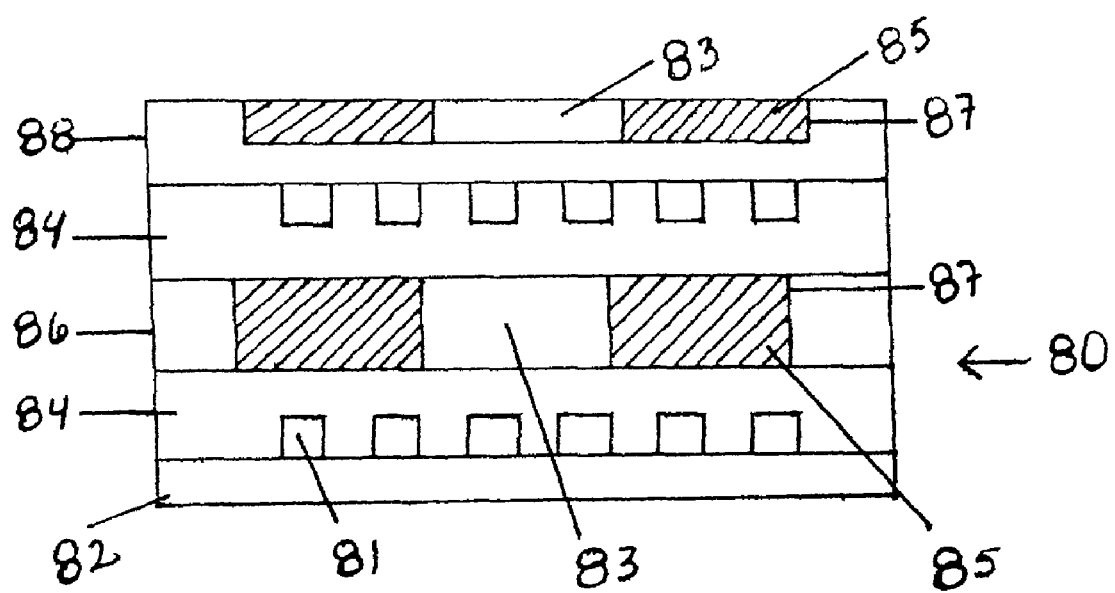
FIG. 8 is a schematic cross-sectional view of a multilayer microchannel reactor.

A schematic cross-sectional view of a layered, multichannel reactor 80 is illustrated in FIG. 8. Layer 82 is a cover plate, layers 84 are microchannel heat exchangers containing microchannels 81. While the microchannels 81 are shown as straight, it should be appreciated that the heat exchange channels could also be shaped, preferably with a shape corresponding to the shape of the reaction channels. Reaction channel layers 86, 88 contain an inlet 83, a relatively wider outlet 87, and sloped reaction channel walls 85. The reaction channel in layer 86 is cut completely through the layer while the reaction channel in layer 88 is only partially cut through the layer. It should be appreciated that the invention has a myriad of possible constructions and could include any number of layers containing channels of various shapes and sizes.

In some preferred embodiments, the reaction channels can have shapes with increasing area from the reaction channel inlet, such as trapezoids, triangles, and curves. The reaction channels can be substantially "two dimensional" with flat surfaces on opposing sides; or the reaction channels can be three dimensional shapes such as cones or pyramids. The reaction channels preferably contain a catalyst and the cross-sectional area of a catalyst-containing portion on the outlet side of a reaction channel is preferably at least twice (in some embodiments at least 5-fold (5×), and in some embodiments at least 20-fold) the cross-sectional area of a catalyst-containing portion on the inlet side of a reaction channel—these cross-sectional areas can be measured at any point on the inlet or outlet sides provided that the areas contain a catalyst. The channels, preferably the catalyst-containing portions, preferably have at least one dimension (not channel length, i.e. not in the direction of net flow) of 5 mm or less, more preferably 2 mm or less. In some preferred embodiments, the area of the reaction channel (preferably the area of the catalyst-containing portion) increases monotonically in the direction away from the inlet or inlets. In some embodiments, the channel may have a cross section (perpendicular to flow) other than rectangular, and the cross sectional area may increase non-linearly with flow path, depending on desired dimensions, temperature profiles, shape of the reactor, and reaction kinetics. One example is a parabolically-shaped cross-section. The cross-section increases along the flow path in a section of the reaction channel, so that the linear velocity of reactive materials may decrease or the contact time between reactive material and the catalyst may increase along the flow path in that section. In some preferred embodiments, at least two, more preferably at least four, reaction channel inlets are arranged radially about a central channel.

In some reactions, it may be advantageous to reduce residence time as the reaction progresses. In such reactions it may be desirable to reduce volume of a reaction chamber in the direction of flow. For example, in autocatalysis, reaction is catalyzed by the intermediates or products and so the reaction rate increases as products are formed. The initial reaction rate is usually slow and the rate increases with residence time in such processes. The industrial importance of autocatalysis (which occurs in a number of reactions, such as oxidations) is that the rate of the reaction can be maximized by ensuring that the optimum concentrations of reactant and product are always present. In order to control the increasing rate with time and promote initial rate, the cross-sectional area of the reactor channel can be reduced gradually along the flow path. The local contact time will be longer in the reactor inlet zone than the outlet zone. The longer residence time in the reactor inlet zone allows faster forming speed of products as catalysts to promote reactions. In contrast, along the flow path to the exit of the reactor, the rate may need to be controlled to prevent reaction "run away." To achieve this effect, the reactants flow in the direction where the cross section is decreasing, or the residence time is decreased along the flow path so that the rate of catalysts (either as intermediates or products) formation is reduced. In this fashion, reaction rate along the bed is made relatively constant which improves product selectivity. Therefore, in some embodiments, the present invention includes the reverse of any of the methods and reaction chamber configurations illustrated or described herein—either as a single channel or as a multichannel configurations. For example, channels that have decreasing volume and flow into a central outlet.

In any of the reaction channel configurations, heat exchange channels can be disposed adjacent to the reaction channels. In the illustrated figures, the heat exchange channels can be adjacent (interleaved) with stacking above and below the plane of the page and/or adjacent within the plane of the page. In the reaction channels schematically illustrated in any of FIGS. 2-4 heat exchange channels can be placed in thermal contact with (preferably adjacent to) the reaction channel or channels. In the embodiment shown on FIG. 4, the reaction channels are preferably separated by heat transfer channels. Thus, the walls of the reaction channels can form the boundaries of heat transfer channels, which also have trapezoidal shapes and are oriented radially from the central area of the reactor. In various reactor configurations, the coolant can flow counter-current, cross-current, or co-current (or combinations of these) with the reactant stream(s). In some preferred embodiments, the process streams and coolant streams are in a counter-flow type of configuration where they exchange heat. Trapezoidal shape (or shapes with cross-sectional area decreasing in the direction of flow, such as pyramidal shape) of the heat exchange fluid flow cross-section would increase local linear velocity near the inlet section of the process channel. The increase of velocity (which applies to both laminar and turbulent flow) of the heat exchange fluid will enhance heat transfer. Of course, for exothermic reactions the heat exchange fluid will be a coolant. The invention may utilize any heat exchange fluids known in the art, including gas, oil, water, liquid metals, etc. While the invention has generally been referred to under steady state conditions, it will be appreciated that the heat exchanger(s) can be used to bring (or maintain) a reaction to a desired temperature range. In some embodiments, the adjacent channels could alternatively be used for another reaction—for example, an exothermic reaction can be conducted in a reaction channel and an endothermic reaction conducted in an adjacent reaction channel, in which case the heat exchange channel(s) could also be conducting a chemical reaction, and could contain an appropriate catalyst.

Catalysts employed in the reaction channels are preferably solids (or contain solids) for heterogeneous reactions that, under the selected reaction conditions, remain (at least partly) as heterogeneous material, that is, the catalyst does not completely dissolve in the process stream. Preferably, the catalyst is essentially insoluble in the process stream. The catalyst may be utilized in a flow-by (such as a coating or thin layer) or flow through (substantially occupying an entire cross-section of the reaction channel) configuration. Examples of catalyst structures include: foams, felts (nonwoven fibers), screens, pellets, saddles, powders, and coatings. In some preferred embodiments, the catalyst is an engineered catalyst. Any of these structures can have multiple layers such as a buffer layer, interfacial layer, and a layer containing a catalytically active metal. The catalyst may contain a single type of material, but more typically will contain multiple materials such as a support and metal or multiple metals, or mixtures of supports, metals, etc. As mentioned previously, the geometry of the reaction channels allows the use of a more active catalyst (and more efficient utilization of catalyst) than could be achieved in a conventional reaction channel geometry. The catalyst may be a fluidized bed or a fixed bed.

This invention also applies to homogeneous reactions. One example is alkylation of paraffin by olefin using sulfuric acid catalyst. In this case, the catalyst, sulfuric acid, is fed with reactants into the reactor channel. Alkylation is exothermic, and the quality of alkylate is dependent on the temperature. The invention presented here can provide a more uniform temperature control and improved alkylated products.

The inventive reactors can be fabricated using methods such as lamination of thin metal sheets (where a reaction channel can be within one sheet, for example, the channel can be etched in a sheet or stamped through a sheet with reaction channel walls provided by adjacent sheets, or a reaction channel can be made up of multiple sheets), micro-EDM drilling, laser machining, chemical etching, injection molding, welding. Materials like metal, alloys, composite, polymers, and ceramics can be utilized. Highly conductive material will enhance heat transfer efficiency and mitigate non-uniformity of temperature distribution. Preferably, at least a portion of a wall or walls of the reaction channel are composed of a thermally-conductive material such as steel or aluminum. For devices made from laminated devices, it can be desirable to stamp shaped reaction channels into a sheet or sheets. Devices fabricated from such sheets will typically have the shaped reaction channel in a single sheet or multiple adjacent sheets (preferably sandwiched between layers of heat exchangers), so that the assembled device will have reaction channels with constant heights as defined by top and bottom sheets defining the top and bottom of a reaction channel (see, for example, FIG. 8).

Operating conditions can be adapted in particular to the particular conformation of the channel, nature and amount of catalyst, and type of chemical reaction performed. Processes of the present invention include: acetylation, addition reactions, alkylation, dealkylation, hydrodealkylation, reductive alkylation, amination, aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dimerization, epoxidation, esterification, exchange, Fischer-Tropsch, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating (HDS/HDN), isomerization, methylation, demethylation, metathesis, nitration, oxidation, partial oxidation, polymerization, reduction, reformation, reverse water gas shift, sulfonation, telomerization, transesterification, trimerization, and water gas shift. For each of the reactions listed above, there are catalysts and conditions known to those skilled in the art; and the present invention includes apparatus and methods utilizing these catalysts. For example, the invention includes methods of amination through an amination catalyst and apparatus containing an amination. The invention can be thusly described for each of the reactions listed above, either individually (e.g., hydrogenolysis), or in groups (e.g., hydrohalogenation, hydrometallation and hydrosilation with hydrohalogenation, hydrometallation and hydrosilation catalyst, respectively).

The inventive apparatus and methods can also be characterized by other measurable properties such as heat flux, linear velocity, local contact times, product selectivity, conversion of reactants and variations in temperature. In some preferred embodiments, heat flux (per unit volume) in the front of the reaction channel (the first 5% by volume; for a catalyzed, flow-through reaction, volume is measured based on catalyst volume (including pores within a catalyst and interstitial spaces between particles), for a flow-by reaction, volume includes open space "above" a catalyst and is based on channel volume in the cross-sectional volume where the catalyst is present on or adjacent to the walls) is at least 10% (more preferably at least 50%, and still more preferably at least 100%) greater than the heat flux in a comparable, straight reaction channel. For purposes of the present invention, a comparable, straight reaction channel has the identical volume and quantity of catalyst as the inventive channel, but the corresponding channel walls are straight; by "corresponding" is meant the shaped walls of the inventive channel; for example, for a conical reaction channel, the comparable reaction channel will be a constant-diameter tube of equal length and volume, and for a trapezoidal reaction channel (in which width increases while height remains constant), the comparable reaction channel will be a parrellopiped of constant height and width (when height=width) and equal volume, length and height. The methods and apparatus can be compared at either the same level of conversion of a selected reactant or at the same flow rate. For referring to apparatus only (not methods) unless otherwise specified, the channels are compared using the conditions and catalyst described in the Examples. Preferably, the linear velocity at the front of the reaction channel is at least 20% more or 20% less than that in the back (the last 5% by volume) of the reaction channel (more preferably the linear velocity at the front of the reaction channel differs from that in the back of the reaction channel by at least a factor of 2, and still more preferably at least a factor of 5). Alternatively, the local contact time at the front of the reaction channel is at least 20% more or 20% less than the contact time in the back of the reaction channel (the last 5%) (more preferably the difference is at least by a factor of 2 and still more preferably at least by a factor of 5). Product selectivity is preferably at least 20% of the desired products, more preferably at least 50% and still more preferably at least 75%, and yet more preferably at least 95% of the desired product(s). Preferably, at least 20% conversion is obtained, more preferably at least 50%, and still more preferably 75%, and yet more preferably at least 95% conversion is obtained, where % conversion refers to percent of equilibrium conversion. In some preferred embodiments, the temperature difference between the front 5% of the reactor (average temperature in that region) and the volumetric center of the reaction channel is at least 20% (more preferably at least 30%, and still more preferably at least 50%) less than the temperature difference at comparable points in a comparable, straight reaction channel. The invention may also be characterized by any combination of any of the foregoing properties. For example, in preferred embodiments, heat flux in the first 5% of volume is at least 10% greater than in a comparable reaction channel and 75% conversion is obtained.

In comparative modeling studies between straight channel reactors and trapezoid channel reactors with different dimensions, it has been surprisingly discovered that the maximum temperature difference could be reduced by nearly one-half by using a trapezoidally-shaped reactor. In addition, the temperature field could be made more uniform and the local hot spot area could be significantly stretched out.

EXAMPLES

Model Conditions and Catalyst

Since Fischer-Tropsch synthesis ("FTS") is a highly exothermic reaction, it is a good model system to validate the concept of the present invention. FTS generally requires temperature control in a narrow range to avoid excessive methane production and catalyst deactivation. Microchannel reactors with straight and trapezoidal channel geometries (table 1) with jacketed active cooling system can be employed to collect reaction kinetics in various process conditions. Porous media containing catalytic materials are packed in the microchannel reactors. The catalysts are supported by packing thin layers of quartz wool and held by metal foams in both ends in a straight channel with the dimensions described in Table 1. Catalyst loading amount is 0.22 gram. The catalyst for this experiment can be prepared as follows. First, acidic gamma-alumina support powder (Engelhard) is ground and sieved to between 80- and 100-mesh (150 to 180-micron), and calcined (stabilized) at 350° C. for 3 hours. This powder is then impregnated with a solution containing cobalt nitrate hexahydrate, ruthenium trichloride hydrate (or ruthenium nitrosyl nitrate), and lanthanum nitrate precursors, present in desired concentrations as to produce a 20-wt % cobalt, 1.37 wt % ruthenium, and 3 wt % lanthanum on alumina catalyst. The precursor solution is prepared in such a manner as to saturate the pore volume of the alumina support without over saturation of the alumina support. This powder is then dried in a vacuum oven at 110° C. for at 12-hours. The powder is then calcined by heating at 350° C. for at least 3-hours. The hydrogen to carbon monoxide mol ratio in feed gas mixture is 2. The feedstocks are preheated to the reactor inlet temperature (248° C.). Both reactors are operated at average conditions of 248° C., 295 psig, and 0.3 sec of contact time.

Modeling Studies

In the modeling studies, the dimension of the trapezoid cross section can be varied to obtain an optimized temperature profile. In this study, catalyst bed length was kept the same as that in the straight channel reactor. The upper base of the trapezoid was at 0.04 inch (0.1 cm) and the lower base was 0.08 inch (0.2 cm). The catalyst bed dimensions are tabulated in Table 1.

TABLE 1

Catalyst bed dimensions

|  | Reactor I (straight channel) | Reactor II (Trapezoidal channel) |
| --- | --- | --- |
| Upper base gap width (cm) | 0.15 | 0.10 |
| Lower base gap width (cm) | 0.15 | 0.2 |
| Channel length (cm) | 0.8 | 0.8 |
| Bed height (cm) | 2.54 | 2.54 |
| Catalyst loading weight (g) | 0.22 | 0.22 |

In our modeling studies, a fixed catalyst volume was set as a baseline to compare the performance of these two reactors so that the contact time was identical with the same feed flow rate. The same final conversion level was obtained in both reactors.

A pseudo-homogeneous model was developed to simulate the temperature and conversion profiles in the catalyst bed. Material balance and energy balance are coupled with the reaction rate in two partial differential equations. Reaction kinetic rate was measured by experiments conducted in a straight channel reactor and correlated to a power law expression, which is function of reactant concentration, temperature and reaction activation energy. Certain reasonable assumptions were made such as plug flow condition, constant wall temperature, preheated feed with reaction temperature etc. Boundary conditions were specified in the positions of reactor inlet, outlet, walls and the centerline. Finite element method built-in FEMLab® software was used to solve this problem. Meshes were generated and refined before initiating the solver. The solution quantitatively provides a picture of conversion, temperature profiles as well as local heat flux profile.

Both reactors were assumed to be operated at 248° C., 295 psig, and 0.3 sec of contact time to achieve 70% integrated conversion. In each case, the local conversion profile was determined as follows. The whole bed is treated as stacks of many "very thin" layer of catalysts (limited or differential segments). Assuming isothermal in each segment, the differential conversion for each segment can be obtained by knowing the reaction rate and residence time. The residence time is simply correlated by flowrate and cross-sectional area.

From the modeling experiments, it was found that the local conversion is greatly reduced in the trapezoid reactor inlet zone and increased in the reactor outlet zone as compared to the straight channel reactor. The local conversion profile (temperature and heat flux) along the catalyst bed was more uniform in a trapezoidal reactor than in a straight channel reactor. It is believed that the more uniform profile resulted because the local contact time increased gradually from the reactor inlet to the outlet section in the taper-shaped design.

Temperature profiles were compared between the trapezoidal reactor and the conventional straight channel reactor. The conventional straight micro-channel reactor showed a 14° C. temperature range within the catalyst bed having a local hot spot having a temperature of 262° C. at the front of the catalyst bed and the bed cooled to about 256° C. in the middle and 248° C. at the end of the catalyst bed. In comparison, the maximum temperature difference within the catalyst bed of the trapezoid reactor was 9° C. with the catalyst bed having a temperature of 258° C. at the front of the catalyst bed cooling to about 257° C. in the middle and 248° C. at the end of the catalyst bed. Thus, in the trapezoidal reactor, the temperature field became more uniform, and the local hot spot area was significantly mitigated.

The trapezoidal reactor design provided reduced heat generation in the prospective hot spot, and increased the heat generated in the cold spot. Short contact time in the narrow inlet section decreases the reaction extent and reduces the heat-releasing rate. The thermal conduction rate is increased due to the decrease of bed thickness. On the other hand, the heat-releasing rate is raised in the wider section of the bed because of the longer contact time. At the same time, the heat conduction is decreased due to the increase of bed thickness. Thus the reaction heat is "forced" to spread out the whole reactor bed, which leads to more uniform temperature distribution. Maintaining a narrow range of temperature results in higher selectivity to desired liquid products. Eliminating hot spots in the bed prolongs catalyst life.

CLOSURE

While preferred embodiments of the present invention have been shown and described, it will be apparent to those skilled in the art that many changes and modifications may be made without departing from the invention in its broader aspects. For example, although the illustrated embodiments described have linear flow directions and flat walls, numerous variations such as curved flow directions and walls are also within the scope of the invention. For example, the channel cross-section can be round instead of rectangular. In each embodiment of the present invention, the channel can have a cross-section that increases gradually over only a section of its length, instead of its whole length as shown in the Figures. Further, the particular embodiments discussed above relate to reactors in which exothermic reactions are performed. However, the present invention is similarly applicable to reactors in which endothermic reactions are performed. In that case, the reactor becomes a heat sink instead of a source. Also, according to the present invention, devices can be made which combine reactors for endothermic and exothermic reactions, for example in a jacketed or sandwich construction with exothermic and endothermic reactions in alternating layers.

Thus, variations are included within the scope of the invention. The appended claims are therefore intended to include all changes and modifications as fall within the true spirit and scope of the invention.

We claim:

1. A method for chemically reacting a composition, comprising introducing the composition into inlets of a plurality of reaction microchannels, the inlets being situated in a common inlet zone and the reaction microchannels radiating from the common inlet zone, wherein, in at least two of the reaction microchannels, an area of a cross-section of the reaction microchannels changes substantially along a flow path in each of said at least two reaction microchannels; and wherein the reaction microchannels comprise a height of 5 mm or less, where height is perpendicular to the direction of flow; wherein walls of the reaction microchannels form the boundaries of heat transfer channels and wherein the reaction microchannels have trapezoidal shapes; and wherein the heat transfer channels have trapezoidal shapes and are oriented radially from a central area of the reactor.

2. The method of claim 1 wherein each of said at least two reaction microchannels contains a solid catalyst.

3. The method of claim 1 wherein the trapezoidal shapes have a cross-section that increases from the inlet toward an outlet.

4. The method of claim 2 wherein the trapezoidal shapes have a cross-section that increases from the inlet toward an outlet.

5. The method of claim 1 wherein the reaction microchannels are in a plane.

6. The method of claim 5 wherein the common inlet zone has an octagonal shape transverse to the plane of the reaction microchannels.

7. The method of claim 1 wherein the reaction microchannels have outlets that are in fluid communication with an annular common outlet channel.

8. The method of claim 1 wherein the reaction microchannels are in a layer of a layered multichannel reactor and wherein the layer comprising reaction microchannels is between layers of microchannel heat exchangers.

9. The method of claim 1 wherein the reaction microchannels comprise two substantially parallel and flat surfaces.

10. The method of claim 1 comprising at least four reaction channel inlets arranged radially about the common inlet.

11. The method of claim 1 wherein the heat transfer channels comprises a coolant that flows in co-current or counter-current flow with respect to flow in the reaction microchannels.

12. A method for chemically reacting a composition, comprising introducing the composition into inlets of a plurality of reaction channels, the plurality of reaction channels comprising outlets being situated in a common outlet zone and the channels radiating from the common outlet zone, wherein, in at least two of the reaction channels, an area of a cross-section of the reaction channel changes substantially along a flow path in each of said at least two channels;
wherein the method is conducted in a laminated device, wherein the at least two reaction channels are disposed radially about the outlet and are disposed in the same layer in the laminated device; wherein the laminated device comprises several layers that each comprise at least two reaction channels radially disposed about the outlet; and further comprising heat exchange channels disposed in layers that are interleaved with said several layers.

13. The method of claim 12 wherein the chemical reaction is selected from the group consisting of: acetylation, addition reactions, alkylation, dealkylation, hydrodealkylation, reductive alkylation, amination, aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dimerization, epoxidation, esterification, exchange, Fischer-Tropsch, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating (HDS/HDN), methylation, demethylation, metathesis, nitration, oxidation, partial oxidation, polymerization, reduction, reformation, reverse water gas shift, sulfonation, telomerization, transesterification, trimerization, and water gas shift.

14. The method of claim 12 wherein the reaction channels have a height of 2 mm or less and a width of 1 cm or less.

15. The method of claim 12 wherein the reaction channels have a height in the range of 0.1 to 2 mm.

16. The method of claim 12 wherein the reaction is autocatalytic and wherein the local contact time decreases as the composition passes through the at least two reaction channels, and wherein the heat transfer distance from the reaction channels to the heat exchange channels is smaller on the outlet side than on the inlet side.

17. The method of claim 12 wherein an exothermic reaction occurs in the reaction channels and an endothermic reaction occurs in the heat exchange channels.

18. The method of claim 12 wherein the reaction channels have a cross-sectional area that decreases monotonically in the direction away from the inlet.

19. The method of claim 12 wherein the reaction channel in said at least two of the channels comprises an essentially constant height of 5 mm or less, where height is perpendicular to the direction of flow.

20. The method of claim 19 wherein the at least two reaction channels are located in a single sheet.

21. The method of claim 12 wherein the heat exchange channels have a trapezoidal shape.

22. The method of claim 12 wherein the at least two reaction channels comprise a flow-by catalyst.

23. The method of claim 12 wherein the at least two reaction channels have a trapezoidal shape in a plane that includes a flow line through the channel.

* * * * *